Dec. 29, 1964     A. LORENZO     3,162,968
BAIT CATCHING RINGS
Filed Jan. 25, 1962
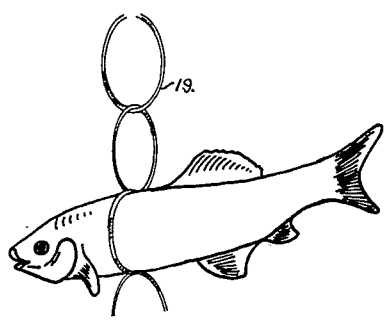
Fig. 1.
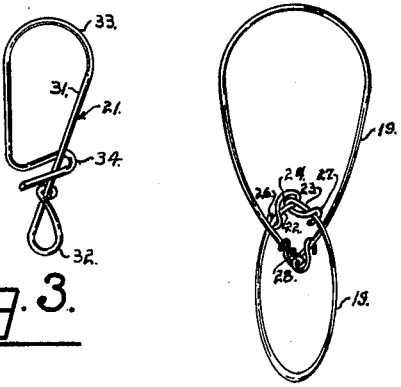
Fig. 3.
Fig. 4.
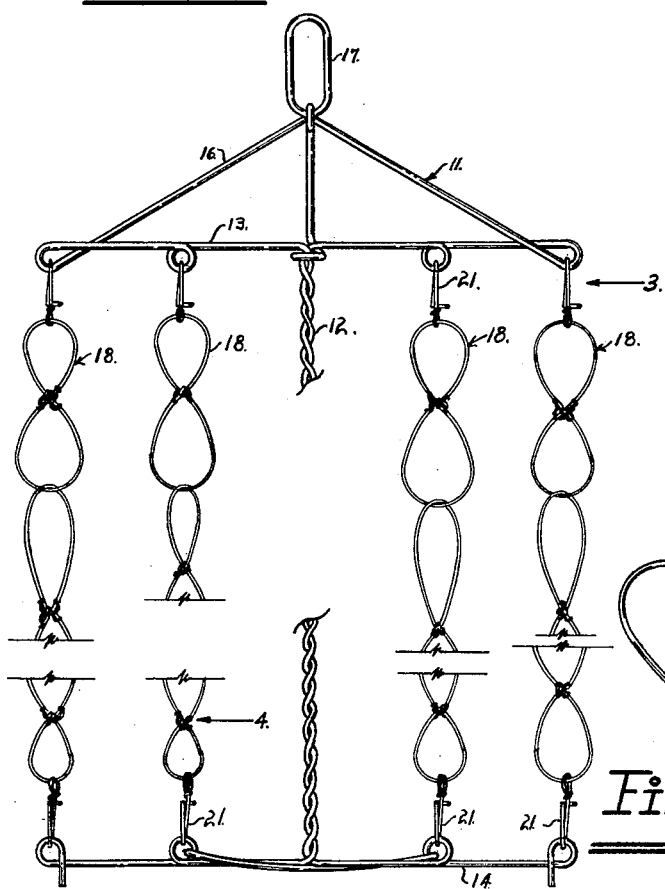
Fig. 2.
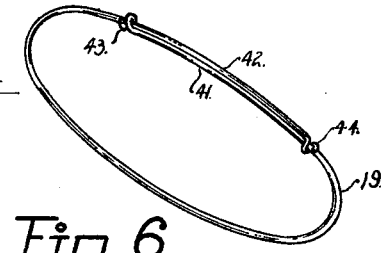
Fig. 5.
Fig. 6.
INVENTOR.
Albert Lorenzo.
BY
John Cyril Malloy

United States Patent Office 3,162,968
Patented Dec. 29, 1964

3,162,968
BAIT CATCHING RINGS
Albert Lorenzo, 3031 Virginia St., Miami, Fla.
Filed Jan. 25, 1962, Ser. No. 168,772
3 Claims. (Cl. 43—10)

This invention relates to fishing equipment, and, more particularly, this invention relates to a bait catching device as more fully described hereinafter.

As is well known, when fishing, one is often required to use live bait in order to catch certain types of fish. This invention provides means whereby live bait may be caught rapidly and with ease.

In the past, small fish such as pilchard, sardines and menhaden have been caught by the use of nets and suction pumps, but it has been found that when schools of these type fish appear close to shore, the use of nets and pumps are prohibited so that the fish have to be caught singly.

This invention has as an object the provision of means whereby live fish may be caught for use as bait in dense schools of such fish.

This invention also has as an object the provision of a fish catching device which may be used to catch larger fish than those of the type described.

It is another object of the instant invention to provide a fish catching means for catching small fish without injuring them and which may be employed where the use of nets is forbidden.

It is also an object of this invention to provide a bait catching device wherein there is provided a stem having affixed thereto a first longitudinal member at one end thereof and a second longitudinal member in spaced-apart, parallel relation therewith at the other end and having a plurality of inter-engaged rings forming a chain disposed between said first and said second members wherein said rings grasp and hold a fish swimming therethrough.

In accordance with these and other objects which will become apparent hereinafter, the instant invention will now be described with reference to the accompanying drawings illustrating a preferred embodiment thereof.

In the drawings:

FIG. 1 is a fragmentary view illustrating the means in which fish are caught by said rings;

FIG. 2 is a partial view illustrating the instant invention;

FIG. 3 is a detail view taken along and looking in the direction of arrow 3 of FIG. 2;

FIG. 4 is a detail view taken along and looking in the direction of arrow 4 of FIG. 2;

FIG. 5 is a perspective view of an alternative embodiment of this invention; and FIG. 6 is a perspective view of an alternative ring for use in the instant invention.

Referring more particularly to the drawings, wherein like reference characters designate like or corresponding parts throughout the different views, and referring particularly to FIG. 2, 11 designates generally a frame having a stem 12 provided with a first longitudinal member or upper spreader bar 13 affixed at one end thereof and a second longitudinal member or lower spreader bar 14 affixed at the other end thereof, said members being in spaced-apart, parallel relationship one with the other. Affixed to the member 13 there is provided a handle or support 16 having a portion 17 adapted to engage a line (not shown). Disposed between said first member 13 and said second member 14 are a series of chains 18 formed of sequentially and directly interengaging oval-shaped, open-loop links or rings 19, said chains being provided at each end thereof with connector means 21 for detachably affixing said chains to said frame.

Referring to FIG. 4, it will be seen that the rings 19 comprise a hoop formed of a flexible strand of wire having a first end 22 and a second end 23, said first end 22 being bent back upon itself forming a loop 24 with the distal end 26 thereof being wrapped around said end 22, said second end 23 being passed through said loop 24 with the distal end 27 thereof being bent back upon itself, whereby a seat is formed for receiving a similarly constructed ring such that when said rings are in engagement one with the other a diametrically opposed tension force exerted on each ring will cause said seat to normally fall into engagement with the seat designated 28 causing said rings to lie in substantially right-angularly disposed planes. For illustrative purposes, in FIG. 2, the rings are not shown precisely in the substantially right angular relationship which they assume relative to one another in use; the relationship being clearly shown upon reference to FIG. 4.

Referring to FIG. 3, the means 21 is shown. It comprises a stem portion 31 having at one end thereof a closed loop 32 and having formed at the other end thereof a loop 33 having a hook 34 formed at the distal end for resiliently engaging said stem and normally maintaining it in the position shown in FIG. 3.

Referring to FIG. 6, an alternative type of ring 19 is shown. The ends 41 and 42 overlap and lie adjacent one to the other with the distal ends 43 and 44 being loosely wrapped around the adjacent end whereby the ring may be expanded or contracted by force, tending to cause said overlapping ends to move relative to each other.

An alternative embodiment of the instant invention is illustrated in FIG. 5 in which there is shown a thin plate 46 having disposed therein a series of holes of varying size for catching fish.

The use of the instant invention will be described primarily with reference to FIG. 2, which is illustrative of the uses for the alternative embodiment discussed hereinbefore. The frame 11 is lowered into water having a school of fish therein by means of a line engaging the portion 17 whereby the chain 18 of rings 19 is immersed in the water. The interengaged rings are drawn into a taut position as the weight of the stem 12, rings 19 and the second member 14 act as a weight exerting a downward force. This downward force causes the respective rings to seat one with the other whereby the openings which they define lie in substantially right-angularly disposed planes. Fish swimming about in the area of the bait catching device will pass into or through the rings, many of which will be caught in the rings as shown in FIG. 1. Because of the shape of fish, as the fish attempts to pass through a ring which is too small to permit the largest part of his body to pass therethrough, the ring will tend to embrace the fish tighter and tighter until he is firmly, but without injury, caught. Varying size rings are provided in order that different sizes of fish may be caught, it having been found that fish will actually swim through the large rings and return to be caught by a smaller ring.

It will also be seen that different chains having different size rings may be affixed to the frame whereby larger or smaller fish may be caught, depending upon the type of bait required.

While the instant invention has been shown and described herein in what is conceived to be the most practical and preferred embodiment, it is recognized that departures may be made therefrom within the scope of the invention, which is, therefore, not to be limited to the details disclosed herein, but is to be accorded the full scope of the claims so as to embrace any and all equivalent apparatus and articles. In the claims, the term "normally" means the position of the part referred to in actual use for the purpose disclosed.

What is claimed is:

1. In a device for snaring fish for bait, a frame defining upper and lower, normally horizontal, rigid, vertically-spaced spreader bars, a plurality of chains, each said chain comprising a single strand formed by a multiplicity of sequentially and directly interengaging oval-shaped open-loop links, each link being adapted to receive and ensnare a fish therein, first connector means attaching the upper link of each said chain in spaced relation to and along said upper bar, and second connector means attaching the lower link of each said chain in spaced relation to and along said lower spreader bar, all said chains being held by said spreader bars in discrete spaced substantially parallel relation, and means carried by said upper bar centrally thereof, to connect the same with a fishing line.

2. In a device for snaring minnows, upper and lower normally horizontal, vertically-spaced spreader bars, a plurality of discrete chains of equal lengths, means connecting the upper and lower links of each said chain, to said upper and lower bars, respectively, in spaced relation therealong, each said chain comprising a multiplicity of consecutive interengaging links, each said link being of light wire and forming an open loop to encircle and snare a minnow therein, and a relatively stiff reinforcing stem fixed at its upper and lower ends to and centrally of said bars, respectively, and maintaining the same normally in spaced apart parallel relation to maintain all said chains substantially taut.

3. In a device for snaring fish for bait, a frame defining upper and lower, normally horizontal, rigid, vertically-spaced spreader bars, a plurality of chains, each said chain comprising a multiplicity of consecutive interengaging open-loop links, each link being adapted to receive and ensnare a fish therein, first connector means attaching the upper link of each said chain in spaced relation to and along said upper bar, second connector means attaching the lower link of each said chain in spaced relation to and along said lower spreader bar, all said chains being held by said spreader bars in discrete spaced substantially parallel relation, and means carried by said upper bar centrally thereof, to connect the same with a fishing line, said frame including a relatively rigid, normally vertical wire stem fixed at its upper and lower ends to said upper and lower spreader bars, respectively, centrally thereof, and maintaining the same in parallel spaced-apart relation and said chains relatively taut.

References Cited by the Examiner

UNITED STATES PATENTS

| | | | |
|---|---|---|---|
| 76,284 | 3/68 | Wills | 43—10 |
| 1,095,697 | 5/14 | Blodgett | 43—100 |
| 1,998,035 | 4/35 | Wilberg. | |
| 2,108,598 | 2/38 | Burr | 43—44.84 |
| 2,690,158 | 9/54 | Petty | 119—3 |
| 2,814,901 | 12/57 | Suiter | 43—42.74 |

FOREIGN PATENTS

| | | |
|---|---|---|
| 18,275 | 2/30 | Australia. |
| 126,337 | 12/01 | Germany. |
| 544,179 | 3/42 | Great Britain. |
| 339,242 | 8/59 | Switzerland. |

ABRAHAM G. STONE, *Primary Examiner.*